United States Patent
Bourgraf et al.

(10) Patent No.: US 8,534,732 B2
(45) Date of Patent: Sep. 17, 2013

(54) COMBINATION COT LOADING AND FASTENING SYSTEM FOR LOADING AND UNLOADING A COT

(71) Applicant: Ferno-Washington, Inc., Wilmington, OH (US)

(72) Inventors: Elroy E. Bourgraf, Naples, FL (US); Warren Dale Sutton, St. Joseph, MO (US); Robert C. Chinn, Cumming, GA (US); Irvin D. Pollock, Wilmington, OH (US)

(73) Assignee: Ferno-Washington, Inc., Wilmington, OH (US)

( * ) Notice: Subject to any disclaimer, the term of this patent is extended or adjusted under 35 U.S.C. 154(b) by 0 days.

(21) Appl. No.: 13/771,805

(22) Filed: Feb. 20, 2013

(65) Prior Publication Data

US 2013/0149085 A1    Jun. 13, 2013

Related U.S. Application Data

(62) Division of application No. 11/630,549, filed as application No. PCT/US2005/023064 on Jun. 30, 2005, now Pat. No. 8,444,195.

(60) Provisional application No. 60/584,012, filed on Jun. 30, 2004.

(51) Int. Cl.
*A61G 3/00* (2006.01)

(52) U.S. Cl.
USPC ............................................. 296/19

(58) Field of Classification Search
USPC ................ 296/19, 20; 5/89.1, 611, 110, 114, 5/620, 625, 626, 627, 8; 16/35 R; 128/842; 169/24

See application file for complete search history.

(56) References Cited

U.S. PATENT DOCUMENTS

| 1,051,480 | A | 12/1966 | Taylor |
| 3,630,565 | A | 12/1971 | Lehmann et al. |

(Continued)

FOREIGN PATENT DOCUMENTS

| DE | 1166415 | 3/1964 |
| DE | 20312525 U1 | 10/2003 |

(Continued)

OTHER PUBLICATIONS

Japanese Office Action mailed Dec. 10, 2012 in reference to co-pending Japanese Application No. 2011-155774 filed Jun. 30, 2005.

(Continued)

*Primary Examiner* — Kiran B Patel
(74) *Attorney, Agent, or Firm* — Dinsmore & Shohl, LLP

(57) ABSTRACT

A combination cot loading and fastening system for loading and unloading an ambulance cot having a normal loading height of about 76 centimeters (about 30 inches) into an emergency rescue vehicle having a transport deck in excess of 78 centimeters (about 31 inches), the vehicle having an opening providing access to the transport deck, is disclosed. The system comprises a pair of tracks, a shuttle assembly to securely pull the ambulance cot along the pair of tracks, and a locking mechanism mounted on the shuttle assembly. The shuttle assembly is configured to position the locking mechanism a distance away from a second end of the pair of tracks and at angle below the transport deck of the emergency rescue vehicle, the angle ranging from about 10° to 25°, and the distance ranging about 22.8 centimeters (about 9 inches) to about 50 centimeters (about 20 inches).

7 Claims, 13 Drawing Sheets

(56) References Cited

U.S. PATENT DOCUMENTS

| | | | |
|---|---|---|---|
| 3,831,996 A | 8/1974 | Layer | |
| 3,918,554 A | 11/1975 | Bourgraf et al. | |
| 4,097,941 A * | 7/1978 | Merkel | 5/86.1 |
| 4,115,884 A * | 9/1978 | Keogh | 5/625 |
| 4,178,032 A * | 12/1979 | Hone | 296/19 |
| 4,273,374 A * | 6/1981 | Portman | 296/19 |
| 4,685,860 A | 8/1987 | McFarland | |
| 5,271,113 A | 12/1993 | White | |
| 5,490,703 A | 2/1996 | Hewko | |
| 5,738,306 A | 4/1998 | Moss et al. | |
| 5,779,296 A | 7/1998 | Hewko | |
| 5,913,559 A | 6/1999 | Sexton et al. | |
| 6,024,528 A | 2/2000 | Taylor | |
| 6,325,363 B1 | 12/2001 | Sakamoto | |
| 6,332,638 B1 * | 12/2001 | Menna | 296/20 |
| 6,527,263 B1 | 3/2003 | Verbrugge | |
| 6,916,056 B2 * | 7/2005 | Mitchell et al. | 296/20 |
| 7,424,758 B2 * | 9/2008 | Broadley et al. | 5/625 |
| 7,520,551 B2 * | 4/2009 | Lambarth et al. | 296/20 |
| 7,540,547 B2 * | 6/2009 | Lambarth et al. | 296/20 |
| 7,621,003 B2 * | 11/2009 | Myers et al. | 5/86.1 |
| 7,631,373 B2 * | 12/2009 | Broadley et al. | 5/86.1 |
| 7,637,550 B2 * | 12/2009 | Menna | 296/20 |
| 7,887,113 B2 * | 2/2011 | Lambarth et al. | 296/20 |
| 2006/0225203 A1 | 10/2006 | Hosoya et al. | |
| 2008/0290679 A1 | 11/2008 | Lambarth et al. | |
| 2011/0229294 A1 * | 9/2011 | Gale | 414/558 |
| 2012/0275896 A1 * | 11/2012 | Magill et al. | 414/800 |

FOREIGN PATENT DOCUMENTS

| | | |
|---|---|---|
| DE | 203 12 525 U 1 | 11/2003 |
| EP | 2000108770 | 4/2000 |
| EP | 1 034 764 A2 | 9/2000 |
| GB | 1051480 | 12/1966 |
| JP | 05031140 | 2/1993 |
| JP | 06285115 | 10/1994 |
| JP | 10248874 | 9/1998 |
| JP | 2000108770 | 4/2000 |
| WO | 2006004820 A1 | 1/2006 |

OTHER PUBLICATIONS

Chinese Office Action dated Jul. 6, 2010 pertains to Chinese Appln. No. 200580025939.2.

Korean Preliminary Rejection, dated Feb. 29, 2012, Korean Appln. No. 10-2007-7002203 Ferno-Washington, Inc.

EPO Extended Search Report dated Oct. 7, 2011, EPO Application No. 11173159.2, Ferno-Washington, Inc.

Chinese Office Action, dated Jun. 30, 2011, Chinese Appln. No. 201010510099.1, Ferno-Washington, Inc.

* cited by examiner

COMBINATION COT LOADING AND FASTENING SYSTEM FOR LOADING AND UNLOADING A COT

CROSS-REFERENCE TO RELATED APPLICATIONS

This application is a divisional of U.S. patent application Ser. No. 11/630,549 filed Nov. 13, 2009 which is a U.S. National Phase Entry of PCT US 05/023064 filed Jun. 30, 2005 which claims priority to U.S. Provisional 60/584,012 filed Jun. 30, 2004.

The present invention relates to the safe loading and secure transportation in an emergency rescue vehicle of a patient transport device, e.g., an ambulance cot, a stretcher, a cart, an incubator transporter, and other similar patient transport devices. More particularly, the present invention relates to a combination cot loading and fastening system, and an emergency rescue vehicle having the combination cot loading and fastening system of the present invention, wherein easy and safe loading and unloading of the patient transport device into the emergency rescue vehicle having a transport deck in excess of 78 centimeters (about 31 inches) is provided.

Emergency rescue personnel (e.g., paramedics) are required to do considerable kneeling, bending, and heavy lifting, and therefore have an increased risk to back injuries. For example, two emergency rescue personnel are required to take up the full weight of a conventional, fully-manual, wheeled patient transport device, such as an ambulance cot, during loading and unloading into an emergency rescue vehicle (e.g., an ambulance), which is an extreme manual lifting operation. Often, the combined weight of such an ambulance cot and the patient exceeds 136 kilograms (about 300 lbs).

The above problem is exacerbated by the fact that in an effort to utilize more cost effective procedures and parts, emergency rescue vehicle manufactures are basing new emergency rescue vehicle (i.e., ambulance) designs on commercially available truck chassis. However, such conventional truck chassis provide a loading bay/transport deck height in excess of 86 centimeters (about 34 inches), approximately 10 centimeters (about 4 inches) increase above the conventional loading height of about 76 centimeters (about 30 inches). In addition to such a loading bay/transport deck height increasing the risk of injury to both patient and emergency rescue personnel, such a loading bay transport height stretches the limit of ambulance cot designs which permit easy and safe loading into the emergency rescue vehicle. For example, emergency rescue personnel (usually two people) may experience increased ergonomic problems lifting an ambulance cot to such an increased loading height. A redesigned ambulance cot will need to provide a higher patient transport surface, approximately 10 centimeters (about 4 inches) in order for the loading wheels of the ambulance cot to reach the higher loading bay of the conventional truck chassis based vehicles. This increase in the ambulance cot's height in order to have a higher loading range, however, will have a smaller size range of emergency rescue personnel that can safely lift and load the ambulance cot into the emergency rescue vehicle. Emergency rescue personnel outside this reduced range may be disadvantaged in that they face greater risks of musculoskeletal injury from having to lift to a higher height. This may be further exacerbated where emergency rescue personnel pairs are of very different heights.

Consequently, while there have been available cot fastener systems utilized in the industry, there has heretofore not been available a combination cot loading and fastening system, and an emergency rescue vehicle having the combination cot loading and fastening system of the present invention, where a range of "average" persons can easily and safely load and unload a conventional ambulance cot into an emergency rescue vehicle having a transport deck in excess of 78 centimeters (about 31 inches), and where redesign of the ambulance cot to be able to reach up and load onto such an exceedingly high transport deck is unnecessary.

The above mentioned problems are met by the present invention, wherein provided are a combination cot loading and fastening system, and an emergency rescue vehicle incorporating the combination cot loading and fastening system which permit a range of "average" persons to easily and safely load and unload an ambulance cot having a normal loading height of about 76 centimeters (about 30 inches) into an emergency rescue vehicle having a transport deck in excess of 78 centimeters (about 31 inches). Additionally, the present invention prevents unnecessary cot movement during transport.

In accordance with the present invention, provided is a combination cot loading and fastening system for loading and unloading an ambulance cot having a normal loading height of about 76 centimeters (about 30 inches) into an emergency rescue vehicle having a transport deck in excess of 78 centimeters (about 31 inches), the vehicle having an opening providing access to the transport deck. The system comprises a pair of tracks mountable to the transport deck of the emergency vehicle and having a first and second ends, and a longitudinal length extending from the first end to second end, the second end being located adjacent but inward of the opening of the vehicle, the tracks having opposing channels. A shuttle assembly engaged for movement in the opposing channels of the pair of tracks and configured to securely pull the ambulance cot along the pair of tracks is provided. The shuttle assembly comprises a frame having a first end, a second end, and a longitudinal body extending from the first end to the second end. The system also provides a locking mechanism mounted on the shuttle assembly and configured to releasably hold the ambulance cot, wherein the shuttle assembly is configured to position the locking mechanism a distance away from the second end of the pair of tracks and at an angle below the transport deck of the emergency rescue vehicle, the angle ranging from about 10° to 25°, and the distance ranging about 22.8 centimeters (about 9 inches) to about 50 centimeters (about 20 inches).

A further understanding of the nature and advantages of the present invention may be realized by reference to the remaining portions of the specification and the drawings.

The present invention is described in detail herein with reference to the illustrative embodiments of FIGS. 1-13, where like reference numerals are indicative of like structural elements.

Figure 1:
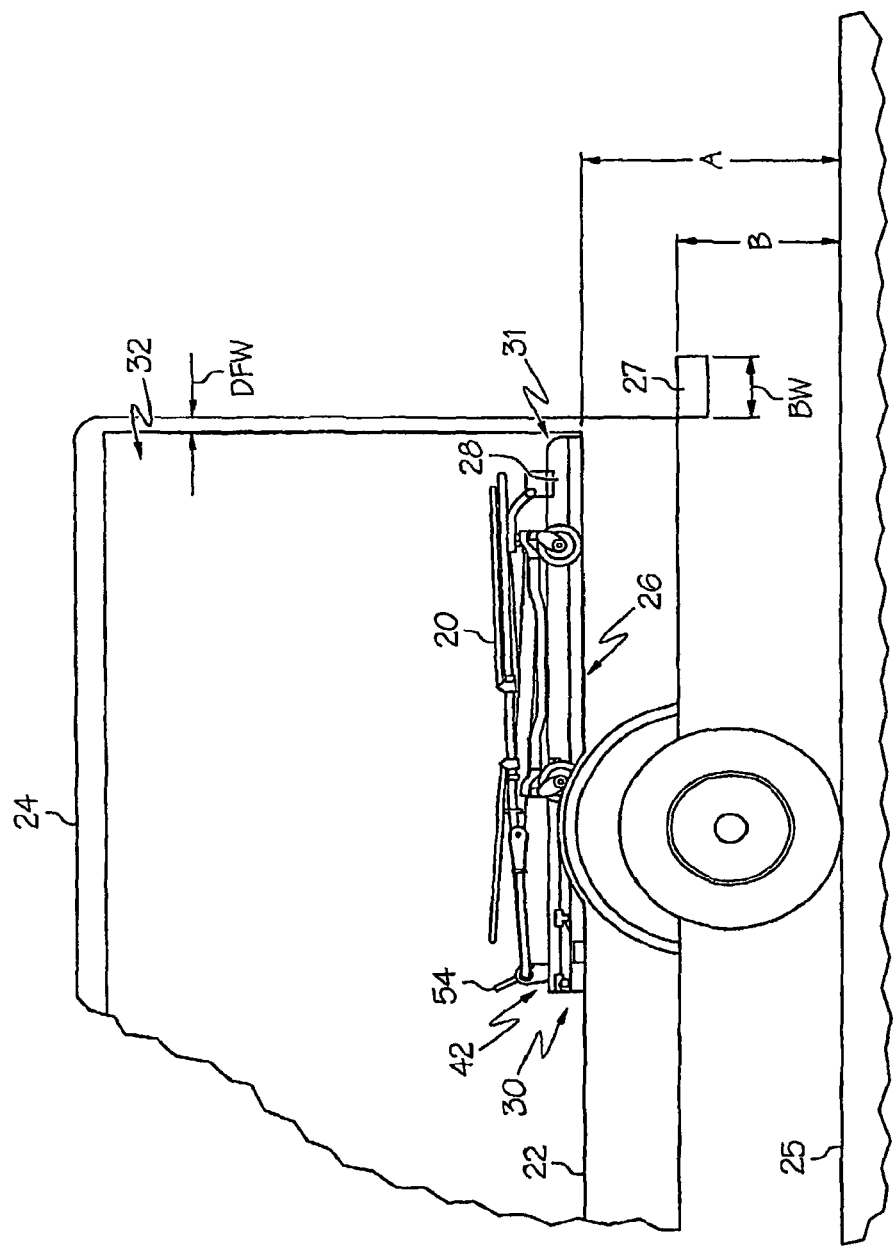
FIG. 1 is an isometric view, partially broken away, of an emergency rescue vehicle provided with one embodiment of a combination cot loading and fastening system according to the present invention.

With reference to FIG. 1, there is shown an ambulance cot 20 situated on a transport deck 22 of an emergency rescue vehicle 24, and loaded and secured thereon with the assistance of a combination cot loading and fastening system 26 according to a first embodiment of the present invention. It is to be appreciated that the transport deck 22 of the vehicle 26 has a vertical height A ranging from about 78 centimeters (about 31 inches) to about 92 centimeters (about 36 inches) above the ground 25. Additionally, an upper portion or step of a bumper 27 of the vehicle 24 has a vertical height B ranging from about 50 centimeters (about 20 inches) to about 60 centimeters (about 24 inches) above the ground 27. As a typical bumper 27 has a width BW greater than 22.8 centimeters (about 9 inches) and the vehicle 24 a door frame width DFW of about 5 centimeters (about 2 inches), the combination cot loading and fastening device 26 is capable of reaching downwardly at least 10 centimeters (about 6 inches) and outwardly at least 22.8 centimeters (about 9 inches) in order to latch onto the ambulance cot 20.

A surface mounted outer track 28 of the system 26 extends from a first end 30 of the emergency rescue vehicle 24 to a second end 31 of the emergency rescue vehicle 24 which is adjacent a door opening 32. It is to be appreciated that the second end 31 of the track 28 is located at least the width DFW, such that a door(s) of the vehicle can seal door opening 32. As is shown best in FIG. 7, outer track 28 has two inwardly facing slotted guide tracks 34 and 36, one being the minor image of the other, extending in parallel and perpendicular to the transport deck 22. The second end 31 of outer track 28 has downwardly sloping curvilinear slotted guide track portions 38 and 40 as best shown in FIG. 3.

It is to be appreciated that the outer track 28 is provided with the same bolt pattern as conventional fastening devices, such as disclosed by U.S. Pat. No. 5,913,559, commonly assigned to Ferno-Washington, Inc., and which the disclosure is fully incorporated by reference herein, to make it convenient to retrofit emergency rescue vehicles with the system of the present invention.

Figure 2:
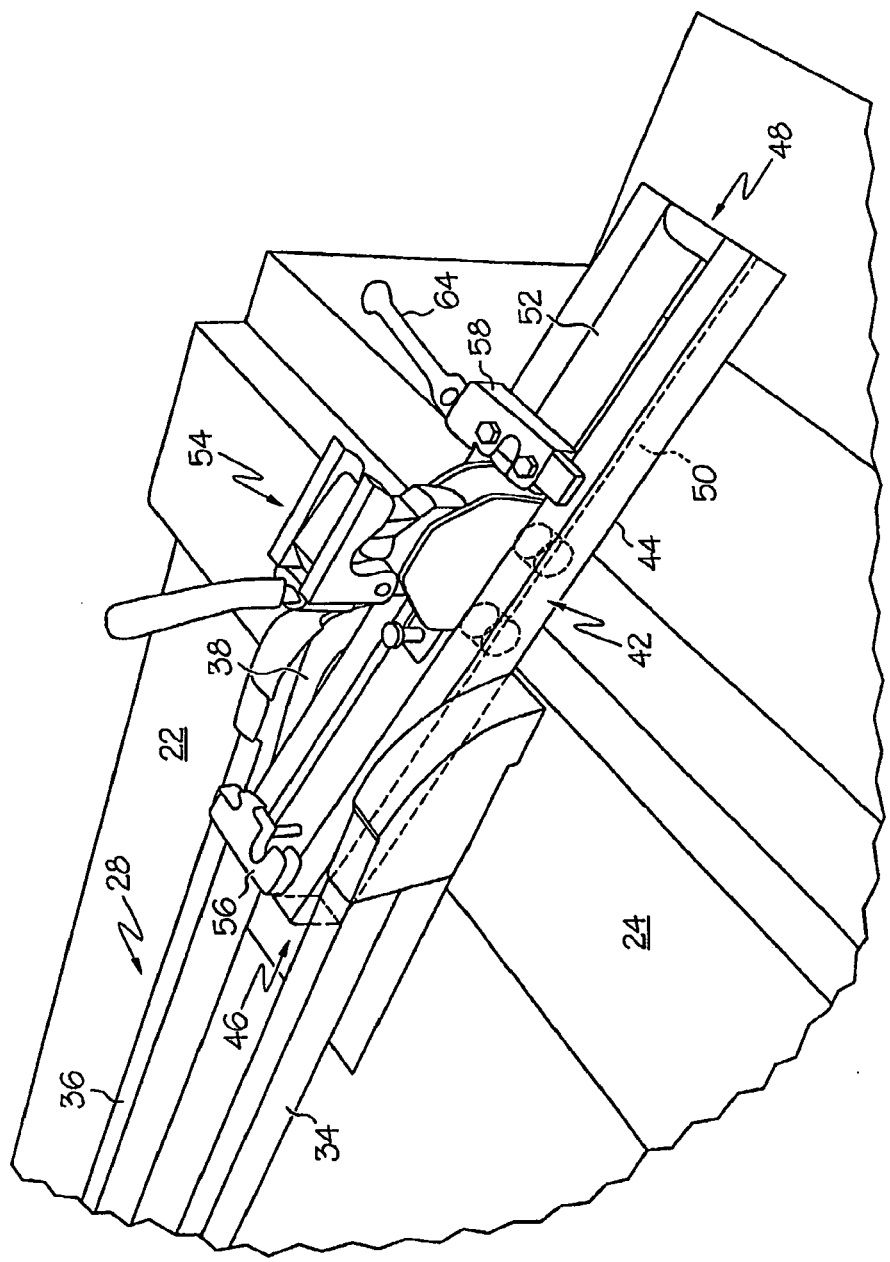
FIG. 2 is a top perspective view of a shuttle assembly according to the present invention.
Figure 3:
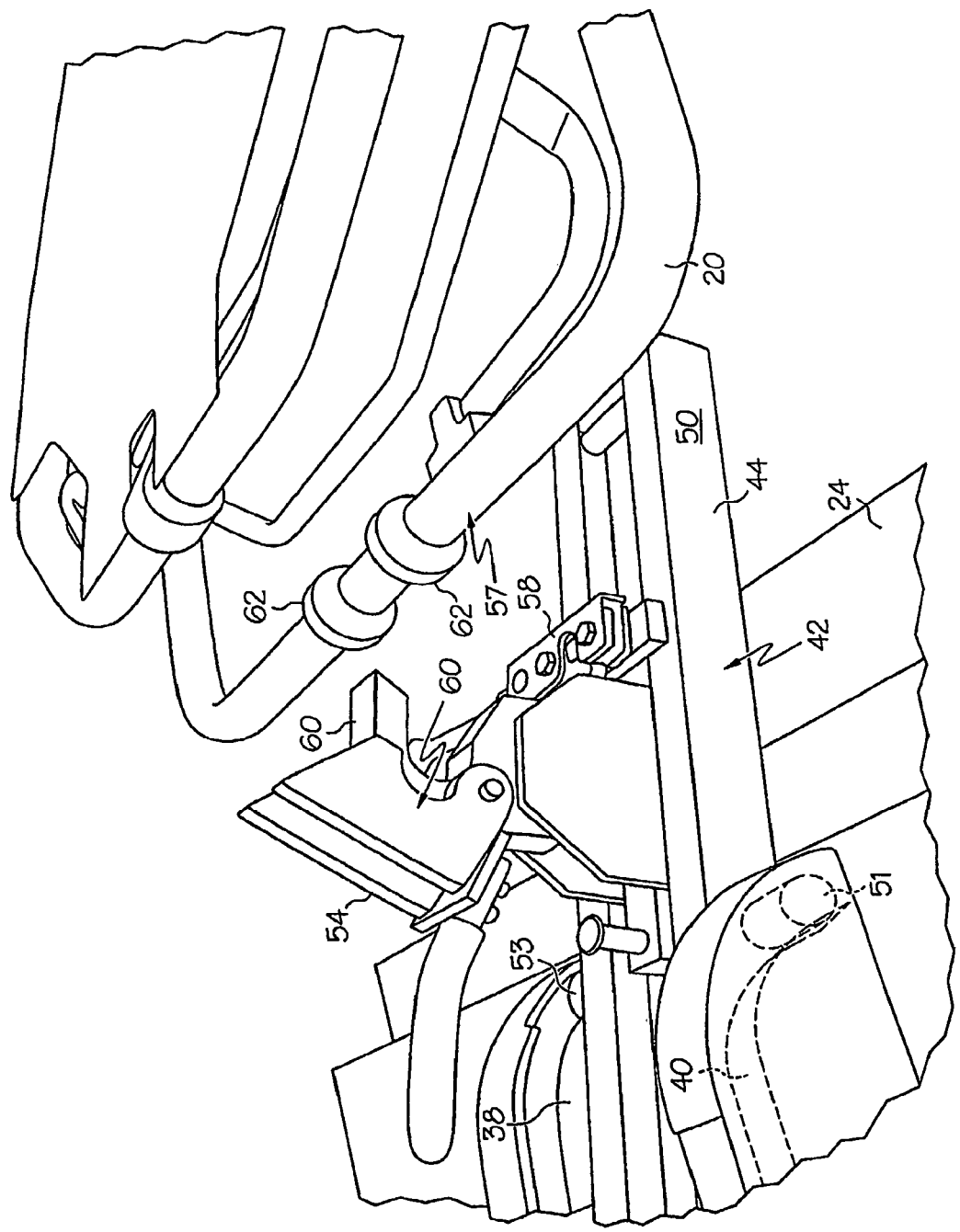
FIG. 3 is a side perspective view of the shuttle assembly of FIG. 2 situated to receive a frame member of an ambulance cot.

With reference to FIGS. 2 and 3, the combination cot loading and fastening system 26 includes a shuttle assembly 42 which engages the outer track 28 for movement along the slotted guide tracks 34 and 36 from one end to the other, and for securely guiding an attached ambulance cot along the outer track 28. The shuttle assembly 42 comprises a second frame 44 defining a shuttle first end 46, a shuttle second end 48, and a longitudinal body 50 extending from the shuttle first end 46 to the shuttle second end 48. As shown in FIG. 3, rollers 51, 53 are rotatably mounted to the exterior side of the longitudinal body 50 and are accommodated within guide tracks 34, 36. The rollers 51, 53 may be adjustable along the length of the longitudinal body 50. The longitudinal body 50 of the second frame defines upper and lower surfaces of an inner track 52. A crash rated locking mechanism 54 engages the inner track 52 for movement along the inner track and for releasably holding the ambulance cot 20 (FIG. 1).

The shuttle assembly 42 is adapted to have a portion of the inner track 52 and locking mechanism 54 there along extend a distance away from the outer track 28, reaching beyond and below the transport deck 22 upon which the outer track 28 is mounted. The shuttle assembly 42 also includes first and second safety catches 56 and 58. The first safety catch 56 releasably locks the rollable locking mechanism 54 adjacent the first end 46, and the second safety catch 58 releasably locks the locking mechanism 54 a relative distance therefrom. It is to be appreciated that the second safety catch 58 is adjustable along the length of the second frame 44 such that the locking mechanism 54 may reach down and hold cots having various full extension heights. Additionally, it is to be appreciated that the locking mechanism 54 is also height adjustable up or down.

In one embodiment, the second frame 44 extends down from a horizontal plane defined by the transport deck 22 due to the curvilinear portions 38, 40 of the outer track 28, in a range from about 10° to 25°, and in one specific embodiment, in a range from about 16° to about 20°. In one embodiment, the shuttle second end 48 of the second frame 44 extends beyond the second end 31 of the outer track 28 in a range of about 22.8 centimeters (about 9 inches) to about 50 centimeters (about 20 inches). With the locking mechanism 54 provided at the end of the second frame 44, such extension and downward deflection ranges permit the combination cot loading and fastening system 26 to safely and securely load the ambulance cot 20 onto the transport deck 22 having a deck height in the range about 78 centimeters (about 31 inches) to about 92 centimeters (about 36 inches) above the ground 25. Accordingly, it is to be appreciated that cot loading wheels or an ambulance cot with an upwardly angled loading end is no longer a requirement for loading into such emergency rescue vehicle with extremely high transport decks.

Figure 4:
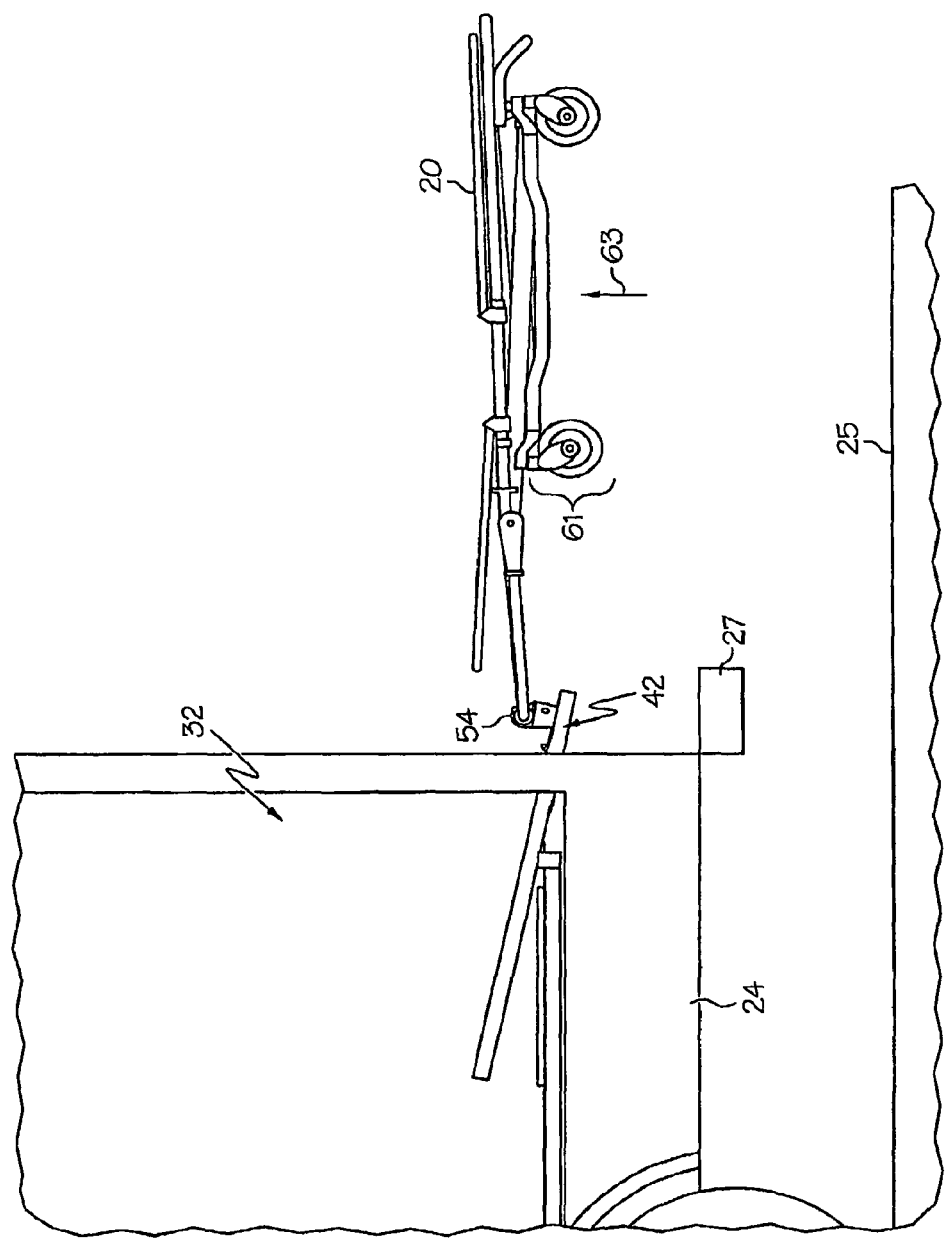
FIG. 4 is a side perspective view of the ambulance cot of FIG. 3 held by the locking mechanism of the shuttle assembly of the combination loading and fastening system according to the present invention.

To load the ambulance cot 20, the shuttle assembly 42 is extended and the locking mechanism 54 is positioned adjacent the second end 48 of the second frame 44, secured in place by the second safety catch 58 as best seen in FIG. 3. The ambulance cot 20 is then rolled towards the system 20, and a handle of the locking mechanism 54 is pulled back in order to place jaws 60 of the locking mechanism 54 between shoulders 62 provided at the loading end 57 of the ambulance cot 20. Next, while the trailing end 59 (FIG. 7) of the ambulance cot 20 is supported by and operated by at least one operator, the undercarriage frame 61 of the ambulance cot 20 is raised (indicated by arrow 63), placing the ambulance cot 20 into lowered position, as is illustrated by FIG. 4.

Figure 5:
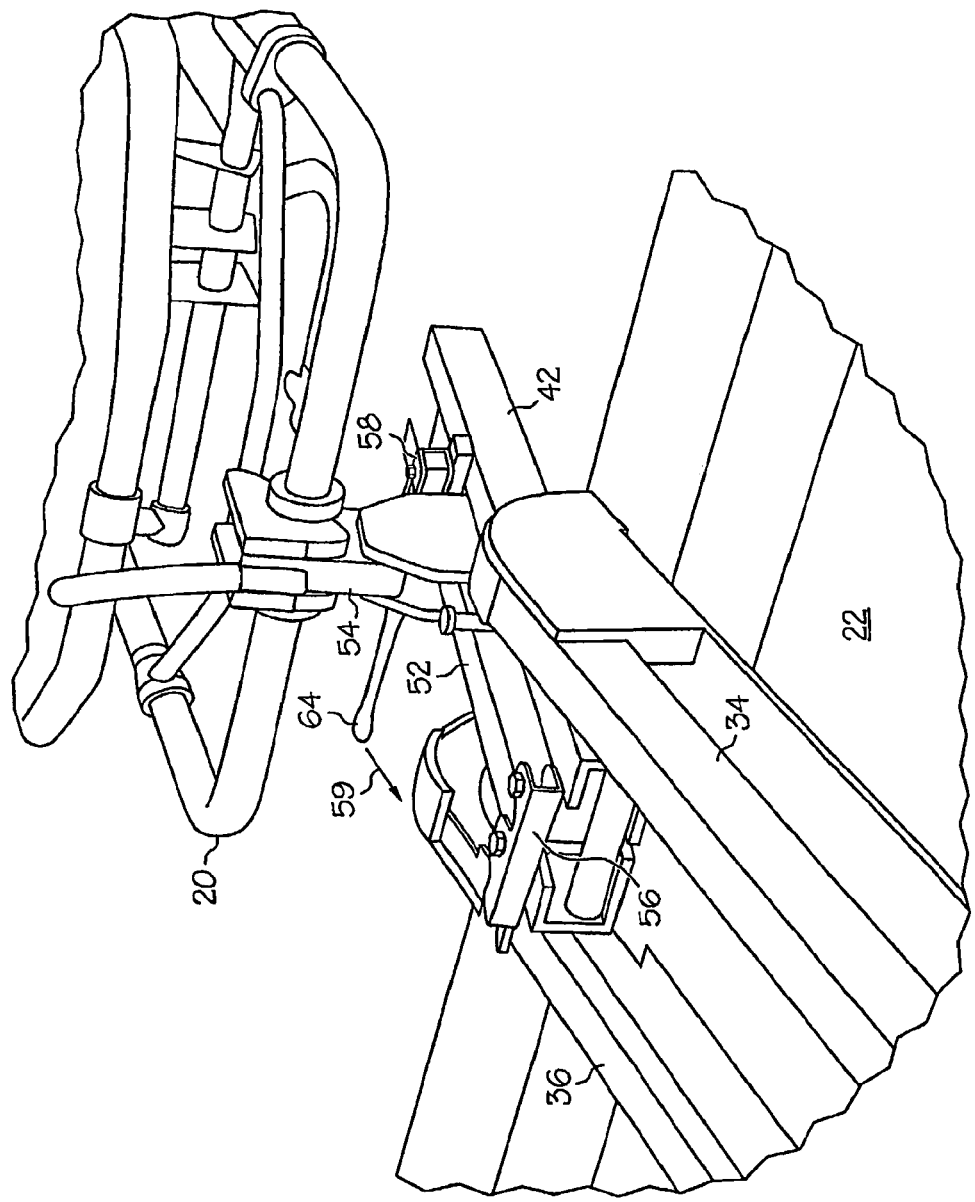
FIG. 5 is a perspective view of the loading end of the ambulance cot identified in FIG. 3, and being held by the locking mechanism of the shuttle assembly while being loading onto the transport deck of the emergency rescue vehicle according to the present invention.
Figure 6:
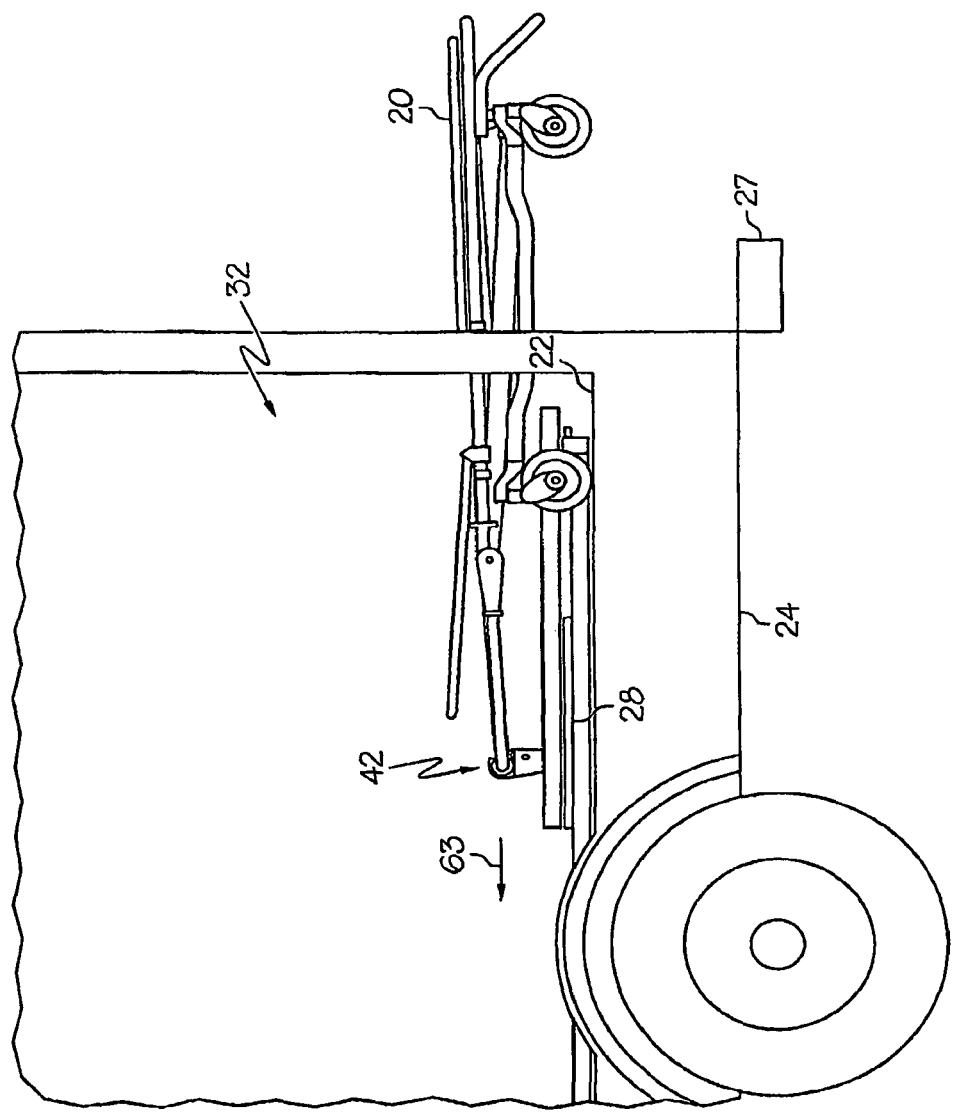
FIG. 6 is an isometric view, partially broken away, of the combination cot loading and fastening system holding an ambulance cot secure in its locking mechanism and with the ambulance cot partially loaded in the emergency rescue vehicle.
Figure 7:
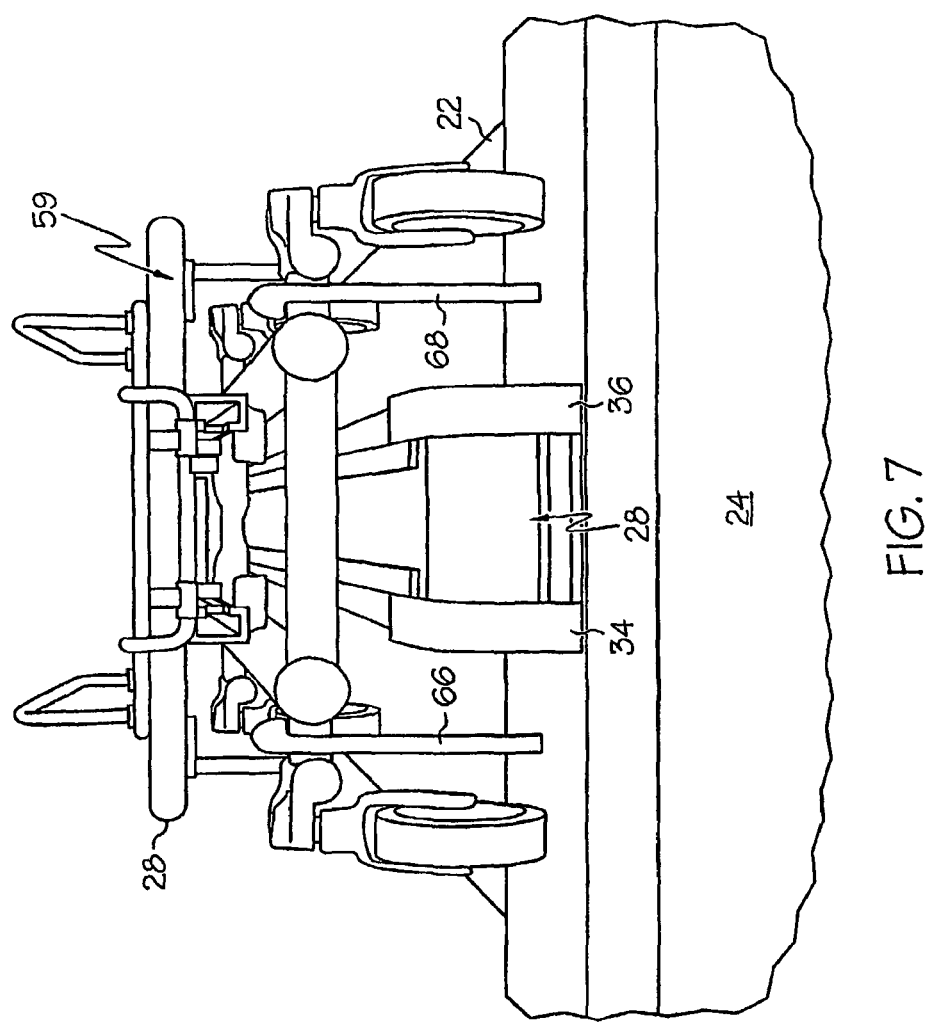
FIG. 7 is a perspective view of the trailing end of the ambulance cot identified in FIG. 3, and showing the ambulance cot fully loaded and held in place by a pair of crash rated restrains according to the present invention.

With reference also made to FIGS. 5 and 6, once the undercarriage frame 61 of the ambulance cot 20 has been securely raised, a release handle 64 for the second safety catch 58 is then pulled (indicated by arrow 59 in FIG. 5), such that locking mechanism 54 guides the ambulance cot 20 along the inner track 52, until locked in place adjacent the shuttle first end 46 via the first safety catch 56. It is to be appreciated that this initial movement of the locking mechanism 54 provides the mechanical advantage need to easily lift and guide the ambulance cot 20 on to the transport deck 22 using only one emergency rescue personnel to push the trailing end 59 of the ambulance cot 20 into the vehicle 24. The shuttle assembly 42 thereafter rolls forwards along the outer track 28 (as indicated by arrow 63 in FIG. 6) until the ambulance cot 20 is fully loaded as illustrated by FIGS. 1 and 7. Once the ambulance cot 20 is loaded, it is to be appreciated that crash rated restrains or securing devices 66 and 68 secure the trailing end 59 of the ambulance cot 20, and lock the ambulance cot 20 in the place on the transport 22 as illustrated by FIG. 7. The steps are reversed for unloading.

Figure 8:
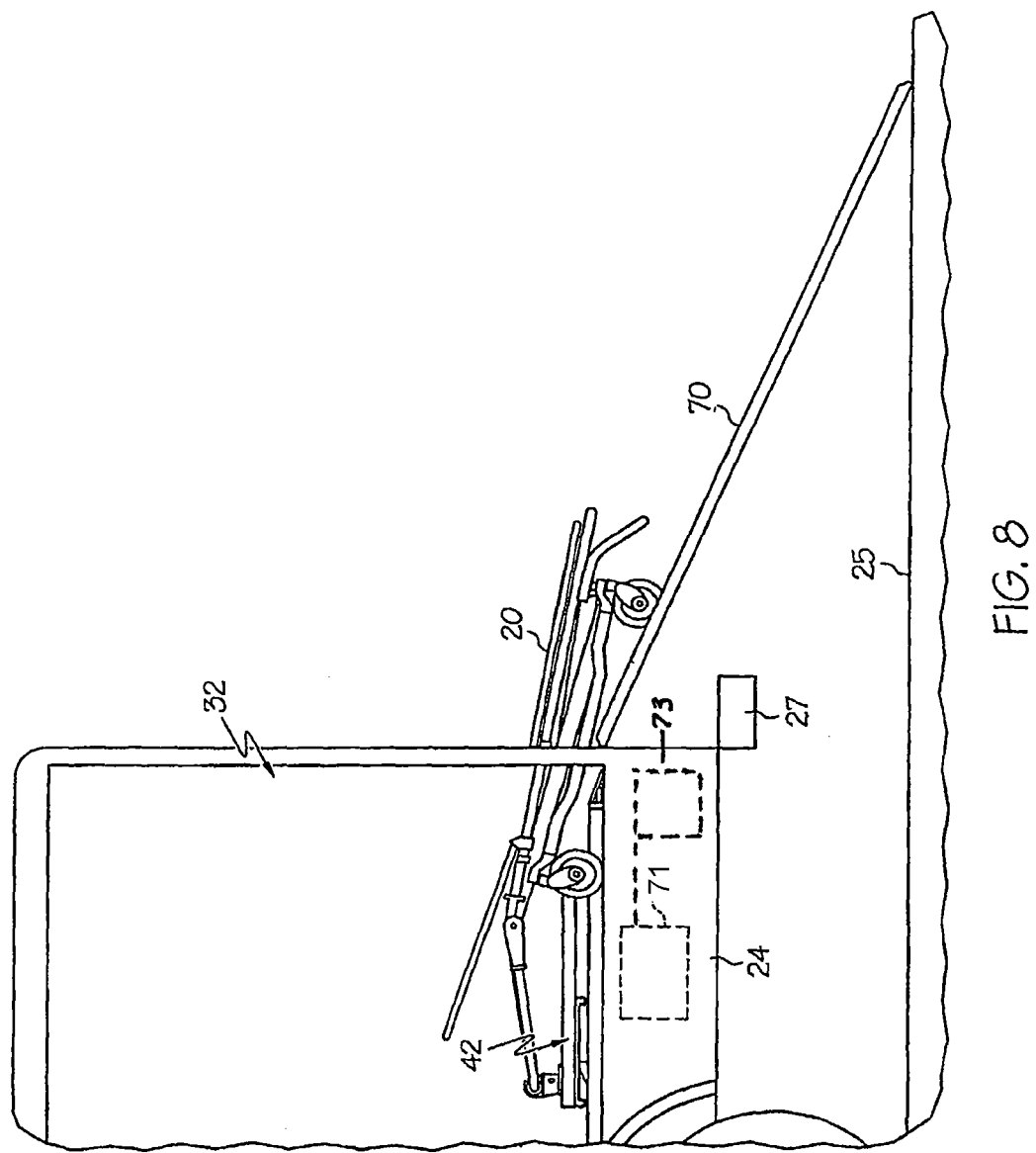
FIG. 8 is an isometric view of the emergency rescue vehicle provided with one embodiment of the combination cot loading and fastening system having an extendable ramp according to the present invention.

If desired, in another embodiment illustrated by FIG. 8, an extendable ramp 70 is provided to help guide the ambulance cot 20 into and out of the emergency rescue vehicle 24. In still other embodiments, the shuttle assembly 52 may be transitioned under power from a suitable drive unit 71. Control and powering of the drive unit 71 may be provided in a conventional manner, using a controller 73, such as discussed hereafter in a later section.

In still other embodiments, the combination cot loading and fastening system 26 is configured to lift an attached ambulance cot under power. Such an embodiment, as well as being suitable for non-powered ambulance cots, is particularly suitable for use with ambulance cots having an undercarriage frame that also lifts under power. Such ambulance cots are disclosed, for example, by commonly assigned U.S. patent application Ser. No. 10/982483, entitled "PNEUMATICALLY POWERED LIFT AMBULANCE COT," and commonly assigned PCT Application Serial No. US05/ 19547, entitled "ELECTRO-HYDRAULICALLY POWERED LIFT AMBULANCE COT," the disclosures of which are herein fully incorporated by reference. As will be explained, this embodiment takes advantage of ambulance cot designs that are also provided with side extension arms or pulls, such as disclosed by commonly assigned U.S. Pat. No. 6,701,545, entitled "IMPROVED MULTILEVEL ROLLIN COT," the disclosure of which is herein fully incorporated by reference.

Figure 9:
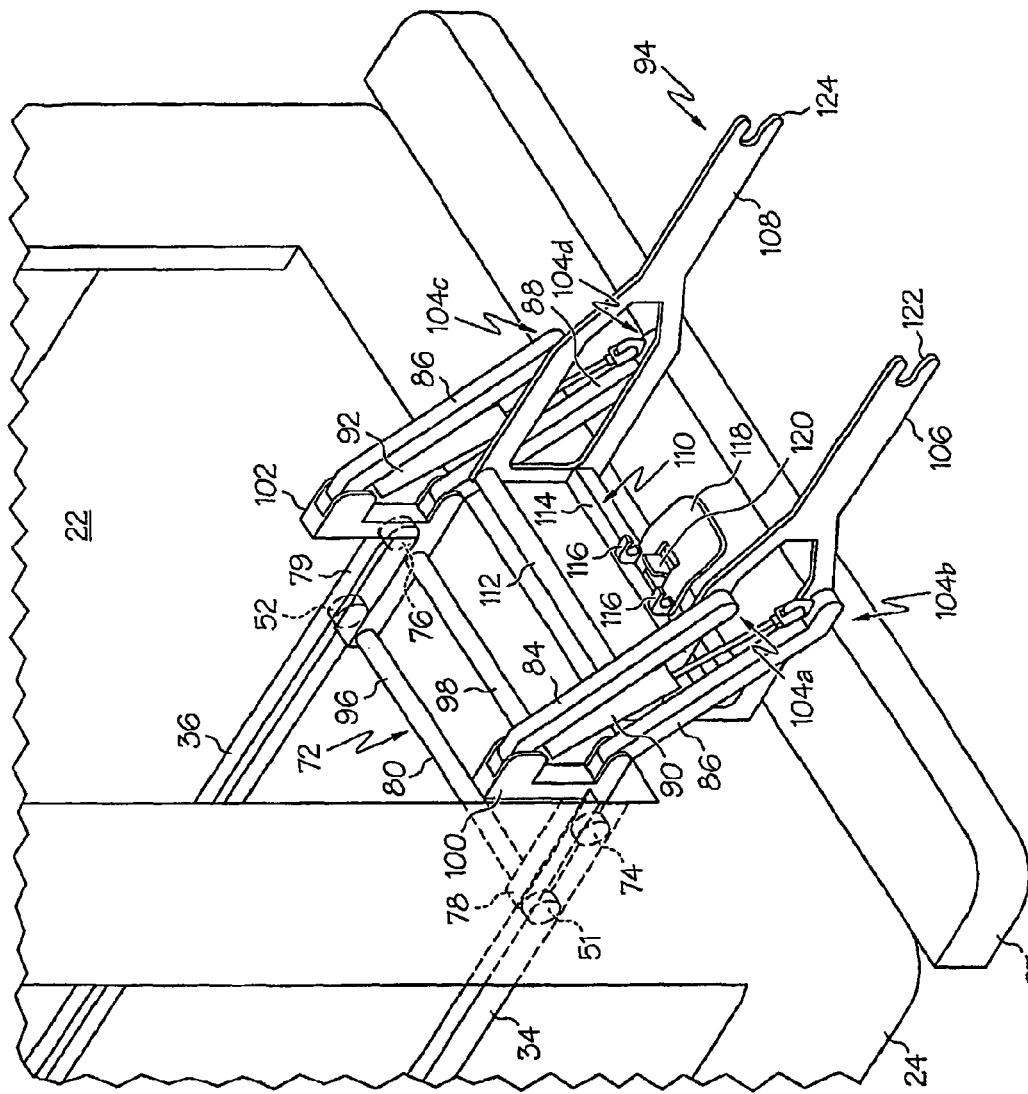
FIG. 9 is a perspective view of another embodiment of a combination cot loading and fastening system having a carriage frame assembly according to the present invention and with the present invention installed in a vehicle shown partially sectioned.

With reference made first to FIG. 9, in this alternative embodiment of the combination cot loading and fastening system 26, the guide tracks 34 and 36 of the track 28 are mounted a greater distance apart in order to slidably accommodate an alternative shuttle assembly 72 which attaches at the front and sides of an ambulance cot as explained hereafter, instead on just at the front of the ambulance cot 20 as with the previously discussed shuttle assembly 42 in reference to FIGS. 1-8. Rollers 74, 76, in addition to rollers 51 and 53, are rotatably mounted to the exterior side of a respective one of a pair of longitudinal frame members 78, 79 of a carriage frame 80 and are accommodated within guide tracks 34 and 36. The rolls 51, 53, 74, 76 are also sized and shaped so that there is only a small gap between the surface of the rollers and the interior of the tracks 34 and 36. Of course, other track 24 cross-sections may be effective in securing the wheels 36 and the present invention is not limited to the shape as shown in FIGS. 9-13.

The shuttle assembly 72 in this alternative embodiment includes the carriage frame 80, two pairs of stabilizer bars 82, 84, and 86, 88, a pair of lifting cylinders 90, 92, and a three point attachment yoke assembly 94. The carriage frame 80 slides along the length of the tracks 34, 36 on the rollers 51, 53, 74, and 76. It is to be appreciated that the carriage frame 80 itself may be formed from a wide variety of members made from a variety of materials, but in the illustrated embodiment, the carriage frame 80 is formed by the pair of longitudinal members 78, 79 joined by traverse frame members 96, 98. Adjacent a front end of each longitudinal member 78, 79 is an upright support 100, 102, respectively, which each pivotably mount a respective ones of the pairs of stabilizer bars 82, 84, and 86, 88, respectively.

The lifting cylinders 90, 92 are fluid-operated linear actuators such as hydraulic cylinders or pneumatic cylinders, or electrically operated linear actuators. A first end of each lifting cylinders 90, 92 is pivotably mounted, between the respective pair of stabilizer bars 82, 84, and 86, 88, to a respective one of the upright supports 100, 102. The other end of each lifting cylinders 90, 92 is pivotably connected to the respective lower stabilizer bar 86, 88. A second end of each stabilizer bars 82, 84, 86, and 88 is pivotably mounted to the yoke assembly 94. It is to be appreciated that the upright supports 100, 102 and their associated stabilizer bars 82, 84, and 86, 88 pivotably connect the yoke assembly 94 to the carriage frame 80 and define pivot points 104a-d.

As illustrated that the upright supports 100, 102 and carrier 80 remain inside the loading bay of the vehicle, and do not extend outwardly therefrom. Accordingly, the associated stabilizer bars 82, 84, and 86, 88 are dimensioned to position the pivot points 104a-d sufficiently distant from the floor 22 of the vehicle 24 such that the yoke assembly 94 can adequately raise the attached ambulance cot 20 (FIG. 10) over the bumper 27 or other structure on the vehicle 24. In one embodiment, the stabilizer bars 82, 84, and 86, 88 are sized to position the pivot points 104a-d about the same extension and downward deflection ranges mentioned above in the previous embodiment having the shuttle assembly 42 (FIG. 2).

The yoke assembly 94 may be formed from metal segments arranged in a variety of manners. Of course, other materials having sufficient strength and rigidity may also be used. The yoke assembly 94 includes two substantially parallel arms 106, 108 separated and mounted to a head frame 110. The head 110 is formed from an upper frame member 112 and a lower frame member 114. Many other arrangements of segments may be used to form the yoke assembly 94 including the use of a single unitary assembly (not shown).

The yoke assembly 94 acts as a first class lever to raise the ambulance cot 20. As mentioned above the yoke assembly 94 provides a three point attachment to releaseably secure the ambulance cot 20 thereto. The first point of attachment of the yoke assembly 94 that engages the ambulance cot 20 is a crash rated locking mechanism 116 provided on the lower frame member 114. A skid plate 118 is provided to guide the loading end of the ambulance cot 20 into engagement with the ambulance cot locking mechanism 116. When the loading end 57 of the ambulance cot 20 is contacted with the cot lock mechanism 116, a latching mechanism 120 automatically springs forward to firmly hold the loading end frame member 128 in the ambulance cot lock. A manual release (not shown) is provided to unlock the ambulance cot lock and simultaneously reset the latching mechanism 120 for operation.

Figure 10:
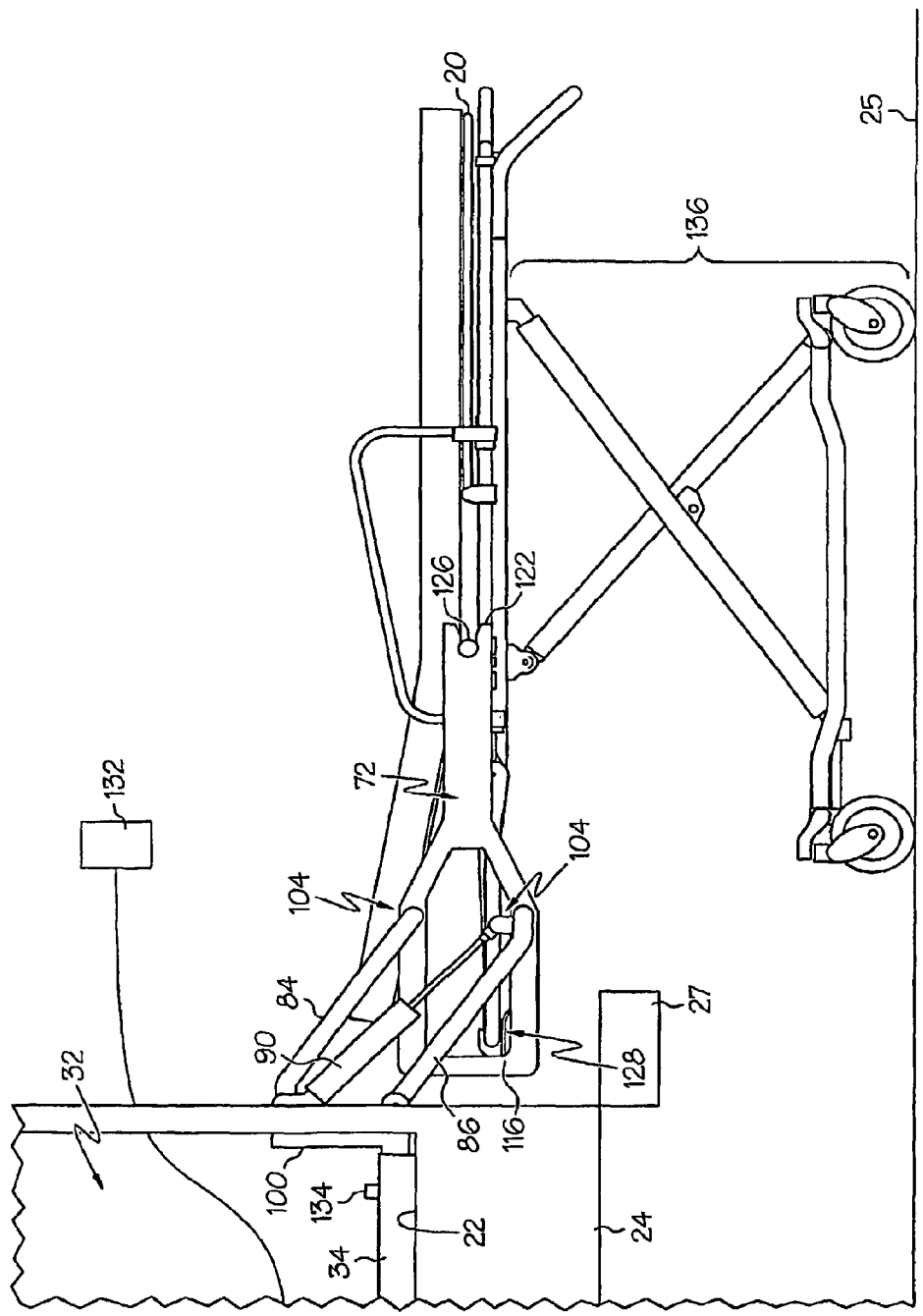
FIG. 10 is a side view of the carriage frame assembly of FIG. 9 securing an ambulance cot with a three point connection in accordance with the present invention.

The second and third attachment points are holds 122, 124 on the ends of each arm 106, 108, respectively which engage the side extension arms or pulls 126 on the ambulance cot 20, which is best illustrated by FIG. 10. As shown by FIG. 10, which is the same on the other side, the holds 122, 124 are formed in the ends of the arms 106, 108 or the yoke assembly 94 and are dimensioned to receive and support the pulls 126 on the ambulance cot 20.

As mentioned previously above, the pivotable engagement between the carriage frame 80 and the yoke assembly 94 defines the pivot points 104*a-d*, and the place where the lifting cylinders 90, 92 connects to the end of the lower stabilization bars 86, 88 is the effort point. As illustrated, the location of the ambulance cot locking mechanism 116 is towards the surface 22 of the vehicle ahead a distance from the pivot points 104*a-d*. Such a positioning takes advantage of the fact that the loading end 57 of the ambulance cot 20 is high enough to clear any obstruction on the vehicle, such as the bumper 27. In this manner, although the pulls 126 on the ambulance cot 20 are located forward of an approximate center of gravity of the ambulance cot 20, the counter balancing of the moments at the ambulance cot locking mechanism 116 and the holds 122 allow easy rotation of the yoke assembly 94 about the pivot points 104*a-d*, thereby raising the ambulance cot 28. This allows for optimal positioning of the ambulance cot 20 for loading into the vehicle 24 for transporting. It is to be appreciated that other locations of the effort point and pivots points are possible, such as connecting the ends of the lifting cylinders 90, 92 directly to the yoke assembly 94.

A controller 132 (FIGS. 10-11) is used to control the extension of the lifting cylinders 90, 92. The lifting cylinders 90, 92 are capable of providing sufficient force to the yoke assembly 94 to raise the ambulance cot 20. The exact capabilities required of the lifting cylinders 90, 92 depend on the dimensions of the yoke assembly 50 and the weight of the ambulance cot 20 being lifted. However, it has been found that the lifting cylinders 90, 92 should have a 25.4 centimeter (about 10.0 inch) actuator stroke and a 544 kilograms (about 1200 lb) lift rating. In one embodiment, the lifting cylinders 90, 92 are electrically operated and are supplied with electricity from the battery of the vehicle 24.

Referring now to FIGS. 10-13, in use the door of the vehicle 24 is opened to allow the carriage frame 80 to slide in the tracks 36 toward the open door to extend the yoke assembly 94 out through the open door. The carriage frame 80 may be locked into place by a locking device 134 to prevent the carriage frame from sliding while the ambulance cot 24 is lifted. Similar locking pins may also be provided at other locations along the tracks 36. The yoke assembly 94 is lowered by extending the lifting cylinders 90, 92 which causes the yoke assembly 94 to pivot about the pivot points 104*a-d* and to be lowered. Then, the ambulance cot is guiding into locking engagement with the ambulance cot locking mechanism 116 which also seats the pulls 126 of the ambulance cot 20 in the holds 122, thereby securing the ambulance cot 20 to the yoke assembly 94 with three points of connection.

Figure 11:
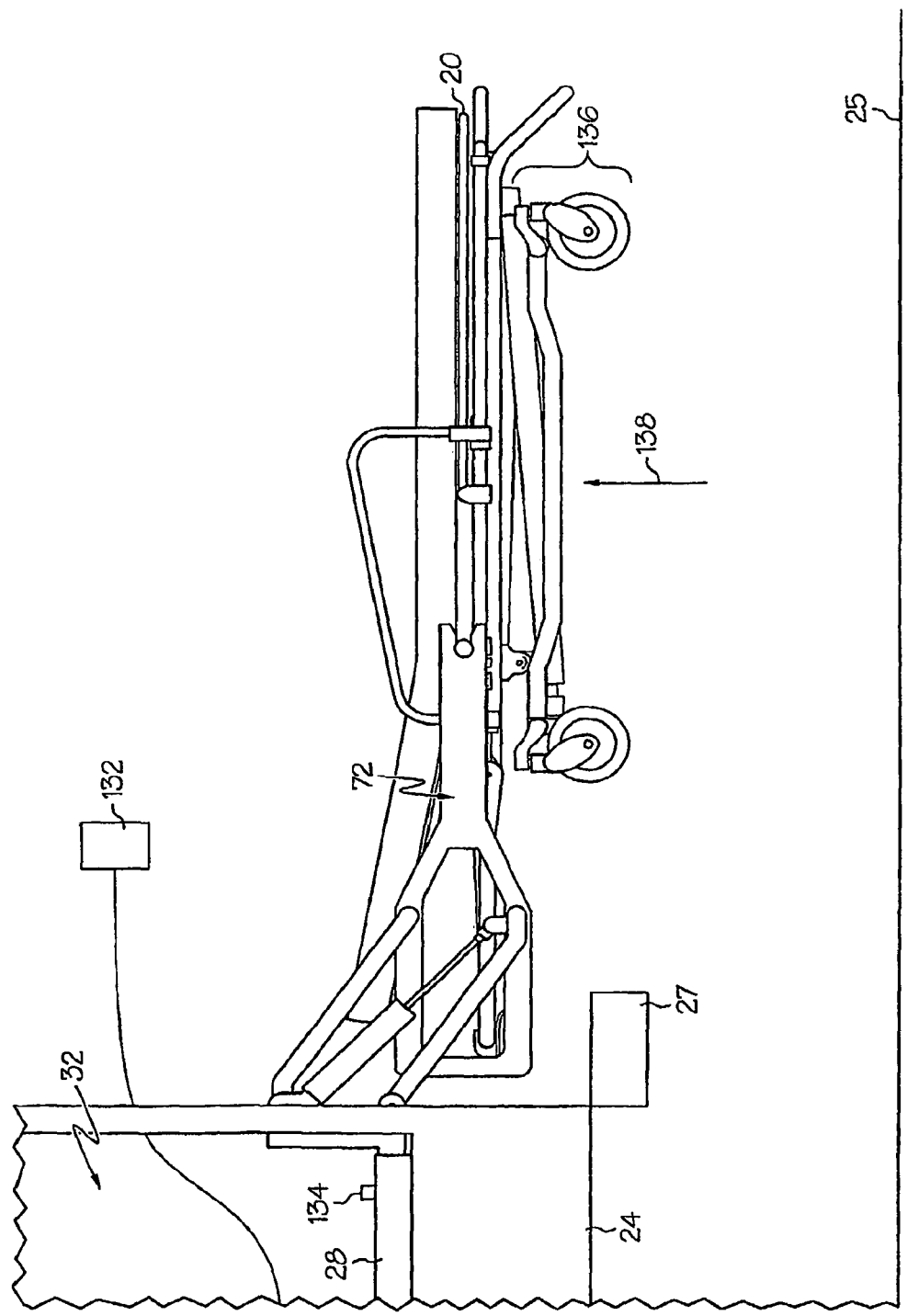
FIG. 11 is a side view of the carriage frame assembly of FIG. 10 securing the ambulance cot with the three point connection in accordance with the present invention, and with the undercarriage frame of the ambulance cot raised.

It is to be appreciated that the three points of connection provided by the yoke assembly 94 to the ambulance cot 20 eliminates any concern of tilting the ambulance cot on a side due to a side imbalance. Additionally, the undercarriage frame 136 of the ambulance cot 20 may be raised (arrow 138) as illustrated in FIG. 11 also without concern of the ambulance cot tipping or unseating from the yoke assembly 94 due to the front and side connections which securely balance the ambulance cot 20 in the yoke assembly 94.

Figure 12:
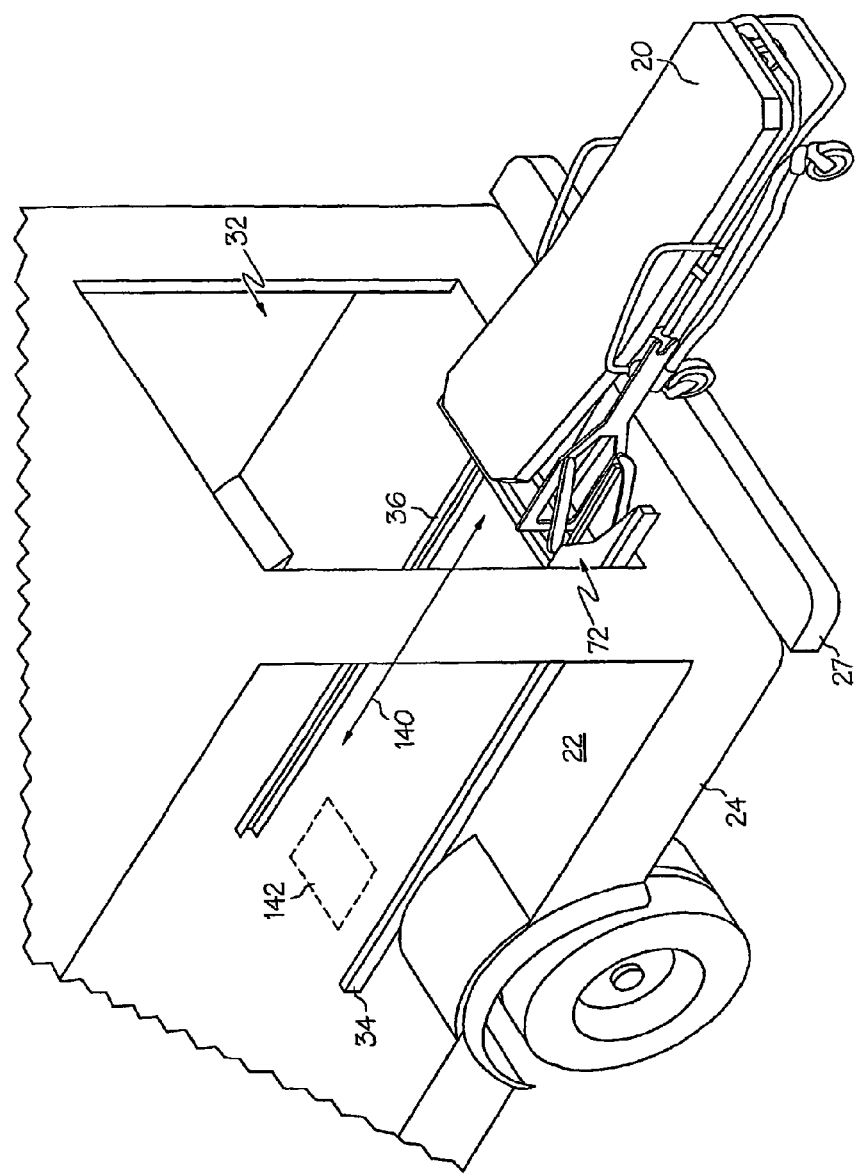
FIG. 12 is a side elevational view of the combination cot loading and fastening system of FIG. 11.

After the undercarriage frame 136 of the ambulance cot 20 has been raised, the yoke assembly 94 is then raised by retracting the lifting cylinders 90, 92 which causes the yoke assembly 94 to pivot about the pivot points 104, lifting the ambulance cot 20 further above the ground such that the wheels 140 of the ambulance cot 20 are above the surface 22 of the vehicle 24, as illustrated by FIG. 12. Once the ambulance cot 20 is fully raised from the ground, the locking device 134 is released and the ambulance cot 20 is transitioned into the vehicle 22 (indicated by the arrow 140) such that the carriage frame 80 slides along the tracks 34, 36.

Figure 13:
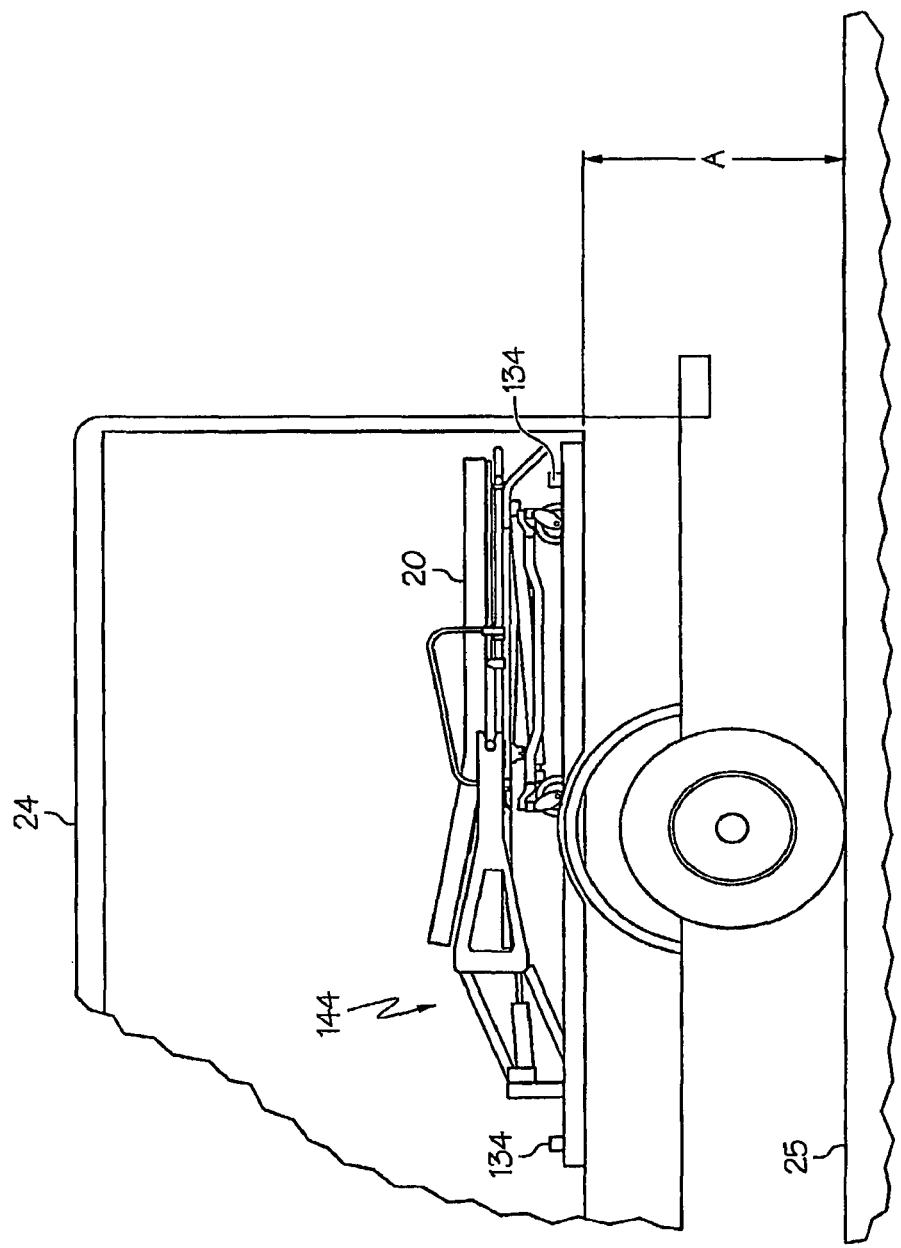
FIG. 13 is a side view of the combination cot loading and fastening system of FIG. 12 with the ambulance cot fully loaded in the vehicle according to the present invention.

In one embodiment, the horizontal transitioning of the ambulance cot 20 into the fully loaded position illustrated by 13 may be manual, and in another embodiment the horizontal transitioning may by powered by a suitable drive unit 142 configured to move the carriage frame 80 about the tracks 34, 36. In such embodiment, the drive unit 142 is controlled by controller 132 and draws the necessary power from the vehicle 24. Such a drive unit embodiment, is also suitable for all other embodiments previously discussed herein. When the carriage frame 80 has been fully pushed into the vehicle 22 as illustrated by FIG. 13, the yoke assembly 94 may again be lowered (indicated by arrow 144) such that the ambulance cot 20 rests on the floor 22 of the vehicle 24 for transport. Securing devices 66, 68 are again used to secure the trailing end 59 of the cot 20 as previously discussed above in reference to FIG. 7. The steps are reversed for unloading.

As will be understood by those familiar with the art, the present invention may be embodied in other specific forms without departing from the spirit or essential characteristics thereof. For example, the invention is not limited to the type and dimensions of the emergency rescue vehicle specifically disclosed. Accordingly, the disclosures and descriptions herein are intended to be illustrative, but not limiting and, therefore, the invention is to be taken as including all reasonable equivalents to the subject matter of the appended claims.

The invention claimed is:

1. A combination cot loading and fastening system for loading and unloading an ambulance cot into an emergency rescue vehicle, the vehicle having an opening providing access to the transport deck, said system comprising:
    a pair of tracks mountable to the transport deck of the emergency vehicle and having a first and second ends, and a longitudinal length extending from the first end to second end, said second end being located adjacent but inward of the opening of the vehicle, said tracks having opposing channels;
    a shuttle assembly engaged for movement in said opposing channels of the pair of tracks and configured to securely pull the ambulance cot along the pair of tracks, the shuttle assembly comprising a frame having a first end, a second end, and a longitudinal body extending from the first end to the second end; and
    a locking mechanism mounted on said shuttle assembly and configured to releasably hold the ambulance cot, wherein the shuttle assembly is configured to position the locking mechanism a distance away from the second end of the pair of tracks and at an angle below the transport deck of the emergency rescue vehicle; and
    wherein said shuttle assembly provides three points of attachment to the ambulance cot.

2. The combination cot loading and fastening system according to claim 1 wherein said shuttle assembly includes a carriage frame having the first end, the second end, and the longitudinal body, said shuttle assembly also includes two pairs of stabilizer bars, a pair of lifting cylinders, and a three point attachment yoke assembly mounting said locking device as one of three attachment points.

3. The combination cot loading and fastening system according to claim 1 wherein said shuttle assembly comprises a three point attachment yoke assembly mounting said locking device as one of three attachment points, and a pair of upright supports mounted on said longitudinal body at said first end, said upright supports each pivotably mount a pair of stabilizer bars and a lifting cylinder, said stabilizer bars of each upright support being pivotably mounted to said shuttle assembly, and wherein said lift cylinders of the pair of upright supports are configured to lift the yoke assembly.

4. The combination cot loading and fastening system according to claim 1 wherein said shuttle assembly comprises a three point attachment yoke assembly mounting said locking device as one of three attachment points, and a pair of upright supports mounted on said longitudinal body at said first end, said upright supports each pivotably mount a pair of upper and lower stabilizer bars and a lifting cylinder mounted therebetween, said upper and lower stabilizer bars of each upright support being pivotably mounted to said shuttle assembly, and wherein each lift cylinder is pivotably mounted to the lower stabilizer bar and is configured to lift the yoke assembly.

5. The combination cot loading and fastening system according to claim 1 wherein said shuttle assembly comprises a three point attachment yoke assembly mounting said locking device as one of three attachment points, and a pair of upright supports mounted on said longitudinal body at said first end, said upright supports each pivotably mount a pair of stabilizer bars and a lifting cylinder, said stabilizer bars of each upright support being pivotably mounted to said shuttle assembly, wherein said lift cylinders of the pair of upright supports are configured to lift the yoke assembly, wherein the upright supports remain inside the opening of the vehicle, and do not extend outwardly therefrom.

6. The combination cot loading and fastening system according to claim 1 wherein said shuttle assembly includes two pairs of stabilizer bars, a pair of lifting cylinders, and a yoke assembly, wherein the yoke assembly includes two substantially parallel arms separated and mounted to a head frame, said head frame mounts said locking mechanism to provide a first point of attachment to the ambulance cot at a front end and said parallel arms provide two additional points of attachment to the ambulance cot on sides thereof.

7. The combination cot loading and fastening system according to claim 1 wherein said shuttle assembly includes two pairs of stabilizer bars, a pair of lifting cylinders, and a yoke assembly, wherein the yoke assembly includes two substantially parallel arms separated and mounted to a head frame, said head frame mounts said locking mechanism to provide a first point of attachment to the ambulance cot at a front end and said parallel arms provide holds for engaging side extension arms of the ambulance cot to provide two additional points of attachment to the ambulance cot.

* * * * *